J. E. BRIERLY.
Toy Wind-Wheels.

No. 154,014.

Patented Aug. 11, 1874.

WITNESSES.
R. Gebner
Dennis Tinney

INVENTOR.
James E. Brierly

BY Cox and Cox his ATTY'S

UNITED STATES PATENT OFFICE.

JAMES E. BRIERLY, OF WORCESTER, MASSACHUSETTS.

IMPROVEMENT IN TOY WIND-WHEELS.

Specification forming part of Letters Patent No. 154,014, dated August 11, 1874; application filed June 30, 1874.

*To all whom it may concern:*

Be it known that I, JAMES E. BRIERLY, of Worcester, Massachusetts, have invented a new and useful Improvement in Toys, of which the following is a specification:

The invention relates to toys which are actuated by means of wind-wheels. It consists in providing a wind-wheel which is attached to an axle that is connected with a figure, the axle turning in posts upon a handle, to which the figure is also attached; the whole arranged and constructed so that the turning of the wheel will cause the figure to move in any desired manner.

Figure 1:
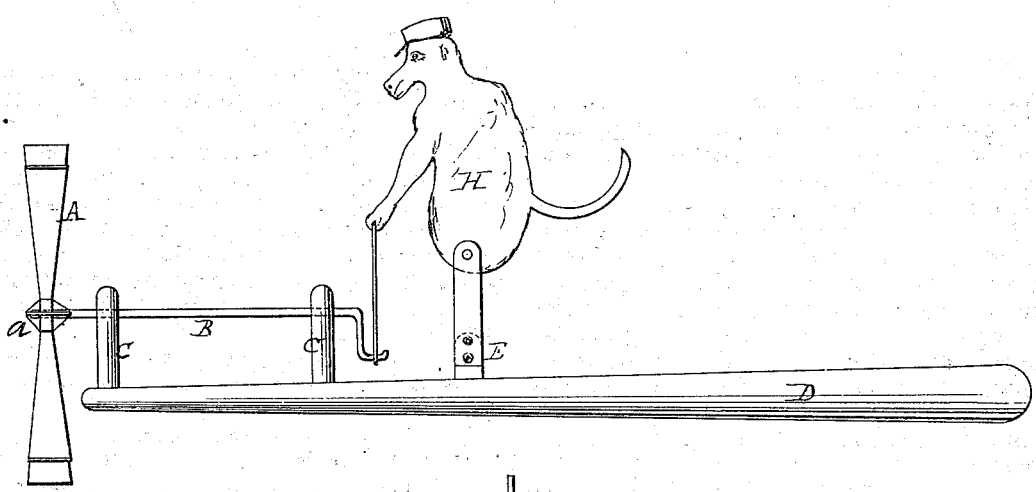
Figure 2:
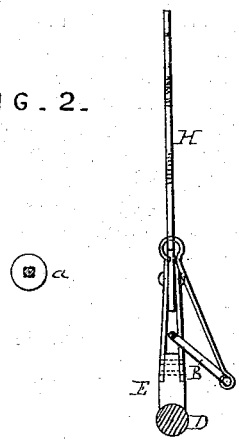

In the accompanying drawings, Figure 1 is a side elevation of a device embodying the invention; and Fig. 2, a cross-section of the same, showing also a rear view of the hub.

A is a wind-wheel of any convenient construction having the hub $a$, in which is cut a rectangular aperture, to which the rectangular end of the axle B is conformed to fit. The axle B turns freely in bearings in the posts C C', which are rigidly fastened to the handle D, near the end thereof that is adjacent to the wheel A. Near the center of the handle D is attached the post E, to which is secured, in any suitable manner, the figure H, which is connected with the axle B, by the revolution of which it is actuated. The end of the handle D is conformed so as to be held in the hand, and may be of ornamental shape.

It is apparent that by constructing the hub with the rectangular aperture, so that it may be attached to the axle B or removed at will when the wheel A becomes torn or injured, a new one may be readily applied without danger of injuring the other parts of the toy; and it is also apparent that figures of different kinds may be attached to the post E, and actuated in sundry ways by the revolution of the axle B, so as to move in a quaint and attractive manner.

I do not, however, claim the wheel or axle alone, as I am aware that they are not new; but What I do claim, and desire to secure by Letters Patent, is—

The wheel A, having the hub $a$, axle B, posts C C', handle D, post E, and figure H, all combined and arranged to operate substantially as shown and described, and for the purposes set forth.

In testimony that I claim the foregoing improvement in toys, as above described, I have hereunto set my hand and seal this 24th day of June, 1874.

JAMES EDWIN BRIERLY. [L. S.]

Witnesses:
 W. A. FISHER,
 S. B. BALL.